June 23, 1931.    J. A. SCOTT    1,811,566
CORRUGATED BAKING PAN LINER
Filed Jan. 2, 1930
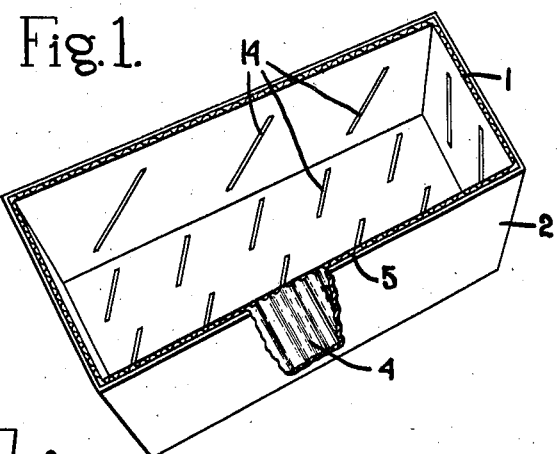
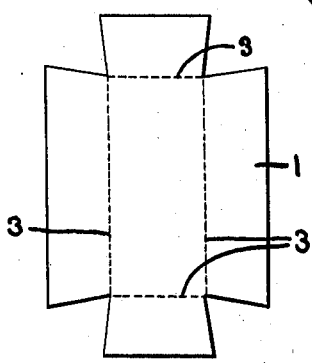
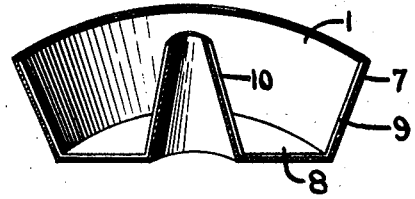
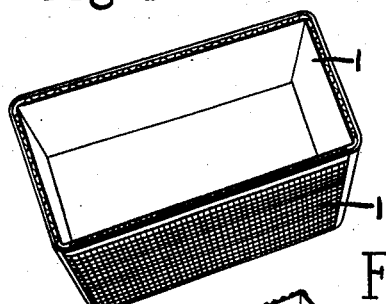
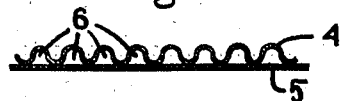
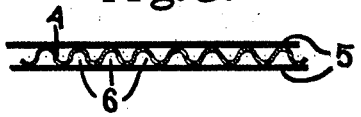
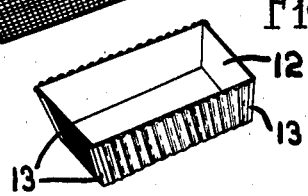
Inventor.
James A. Scott
by Heard Smith & Tennant
Attys.

Patented June 23, 1931

1,811,566

UNITED STATES PATENT OFFICE

JAMES A. SCOTT, OF SOMERVILLE, MASSACHUSETTS

CORRUGATED BAKING PAN LINER

Application filed January 2, 1930. Serial No. 418,145.

This invention relates to hollow paper baking containers to be used either with or without a baking pan or other utensil, and has for its general object to provide a means to facilitate the process of baking and to insure a more thorough and even application of heat to the product thus increasing the quality thereof.

Another object of the invention is to provide a container or liner which by reason of its inherent stiffness may be cut, and creased in such a manner that it may be readily inserted in a pan or other utensil and caused to lie flat in contact with the internal surface of the pan.

A further object of the invention is to provide a container or liner which will prevent the bread, cake or other product from adhering to the pan.

A further object of the invention is to provide a liner or container which is easily and cheaply made of a sheet material, and which will provide sufficient protection to the product during and after the baking process.

A further object of the invention is to provide a liner or container having openings therein to permit the escape of steam or gases generated by the baking process A further object of the invention is to provide a baking container having an air cell construction to insure an even circulation of heat about the product during the baking process when the container is used in connection with a pan or other baking utensil.

These and other objects and features will more fully appear from the specification in connection with the accompanying drawings, and will be particularly pointed out in the claims.

In the drawings:

Fig. 1 is a perspective view illustrating a preferred form of the invention in position within a baking utensil.

Fig. 2 is a view of the liner or container as it is cut from sheet material and before it is shaped to its final form.

Fig. 3 is a cross sectional view showing the device applied to a different form of utensil.

Fig. 4 is a view in perspective illustrating the invention as applied to a basket form of utensil.

Figs. 5 and 6 illustrate two preferred forms of construction for the sheet material out of which the liner is constructed.

Fig. 7 is a perspective view of the liner construction for use independently of a baking pan or other utensil.

In the art of baking especially on a large production basis uniformity and high quality of product are essential. Furthermore such results must be accomplished with a minimum of expense. The present invention resides in providing a device which speeds up production and produces a more uniform high quality product. These desirable results are obtained by the use of a novel form of receptacle which may be used as a liner in the usual form of baking pan or other utensil, or may be used as an independent container.

The container is fabricated of a novel sheet material desirably having a layer of corrugated or fluted paper, and a smooth flat layer united therewith either on one or both of its faces. Such construction provides a material which is light and has the desirable quality of inherent stiffness.

Considerable difficulty is encountered in handling a paper liner of the usual type. Much unnecessary time is consumed in fitting the liner to the pan on account of the tendency of the paper to buckle and refuse to lie flat within the pan or other utensil. The usual liner must be carefully put in place and adjusted to the pan. Furthermore when such a liner is in place there is nothing to prevent its creeping or slipping out of position, a difficulty which invariably arises during the filling operation. The liner herein presented wholly eliminates slipping or creeping when the liner is filled either by hand or by machine.

The drawings illustrate a preferred embodiment of the invention in which a liner 1 is fitted within the pan 2 wholly covering the inner surfaces of the bottom and sides thereof. Any desirable method may be used to prepare the container to be fitted into the pan 2. As shown, a sheet of especially constructed material is cut to the proper shape and size to constitute a development of the inner area of the pan as shown in Fig. 2. In order to facilitate the insertion of the liner within the pan the liner may be creased along the dotted lines 3 shown in Fig. 2 located at the junction of the side sections with the bottom section. It is not essential, however, to crease the device as above described since by pressing the liner into position the material will automatically fit itself to the pan.

The material out of which the liner is constructed is composed of a corrugated layer 4 preferably of that type of paper known to the art as parchment, and one or more layers 5 of flat smooth sheets which are cemented or otherwise united to form an air cell construction which is very stiff and light. Fig. 5 is a cross section transversely of the corrugations showing the individual air shells 6 as formed by such construction. In Fig. 6 a similar construction is shown having a flat sheet 5 on both faces of the corrugated sheet 4.

The liner is readily adaped to all shapes and sizes of utensils. Fig. 3 illustrates the method of adapting the liner to a round or oval receptacle. In this construction the liner may conveniently be made in sections. A bottom section 8 is cut to fit the bottom of the pan, and a separate section 9 to cover the side of the pan, while a cone-shaped section 10 is properly shaped to cover the cone-shaped central element of the pan. Fig. 4 shows the liner as used with an ornamental container such as the basket 11.

As above pointed out the character of the sheet material is such that a container 12 may be constructed in which the baking process may be carried on without the support of a pan or other utensil. In such case the container may serve to protect the product after as well as during the baking process, and incidentally give the product a more attractive and finished appearance. The container 12 may be formed in any desirable manner. As shown herein the sheet material is cut to the desired shape in a manner similar to that shown in Fig. 2, and is formed into a hollow container by bending upwardly the sides until the ends of the sides meet, and then applying a strip of adhesive material 13 at each of the corners.

During the baking process, steam and gas are generated which in some cases cause a very undesirable condition in the product such as large air or gas pockets which remain in the finished product rendering it unsalable and of an inferior quality. Owing to the lateral resiliency of the liner, such undesirable air or gas pockets cannot readily form. If such a tendency exists the gas or air may find its way to the outer surface.

If a pressure is generated tending to form such an air pocket adjacent the sides or bottom of the pan, the pressure will be relieved as the liner yields slightly laterally and pass it to the atmosphere between the sides of the product and the liner. In order to assist in this action, however, the sides and bottom may be provided with openings in the form of slots 14 through the flat surface layer 5. By means of this construction the gas may readily pass into the air cells 6 and thence to the atmosphere.

The air cells structure of the liner is one of the important features of the invention. When used as a liner in connection with a pan or other baking utensil, the air cells permit circulation of the heated air within the oven completely around the product during the baking process. Such a condition obviously tends to subject the product to an even application of heat, an ideal condition which produces a perfectly uniform product.

Another important feature of the invention is the ease with which the liner may be inserted in the utensil. When the liner has been prepared as shown in Fig. 2 either creased or not, but preferably creased at the junction of the bottom and sides thereof, the liner is pushed into the pan 1 and due to its inherent stiffness will automatically fit accurately in position, and furthermore will not be readily dislodged from such position. This simple method saves much time as compared to the time consumed in fitting the old type of liner in place.

The liners may be made up in various ways. For instance for some types of dough, the baker finds it desirable to have the corrugations 4 in the inside of the liner, while for other types of dough the flat layer 5 is desirably located on the inside of the liner.

Another possibility in using the liner especially for production in large quantitites is to make up the liner as shown in Fig. 7, and by nesting the liners to save space it is feasible to manufacture in advance a large quantity for use as required. There is thereby made available for immediate use a container which may be used as a liner or as an independent baking utensil.

After the baking process has been completed the baked article with the liner or container thereon may be readily removed from the baking utensil. If the article is to be handled or shipped the liner desirably is left in position on the product to serve as an effective protection therefor against physical injury. Furthermore the liner by its close contact with the article prevents evaporation of moisture therefrom thus keeping it fresh for a long period of time.

Having thus described the invention, what is claimed as new, and desired to be secured by Letters Patent, is:

1. A hollow container for baking formed of fabricated sheet material having a corrugated outer layer, and a flat smooth inner surface layer united to form an air cell structure.

2. A baking pan liner shaped to cover the inner area of the pan comprising a fabricated sheet having a corrugated core and flat smooth outer layers united to form an air cell structure.

3. A removable baking pan liner comprising a hollow shell fabricated of sheet material having a corrugated outer and a flat smooth inner layer united to form an air cell structure, and provided with openings communicating from its inner surface to said air cells thereby to permit the escape of steam or gas generated by the baking process.

4. A removable baking pan liner formed of fabricated sheet material having a corrugated outer and a smooth inner flat layer united to form an air cell structure, said sheet material being cut to fit the inner area of the pan, and creased at the junction of the sides with the bottom, thereby to permit the liner to be readily pushed into accurate position in the pan with a single movement.

In testimony whereof, I have signed my name to this specification.

JAMES A. SCOTT.